Dec. 13, 1955     C. W. BUGBEE     2,726,894

MOTOR VEHICLE BODY CONSTRUCTION

Filed Dec. 9, 1954

C. W. BUGBEE
INVENTOR.

BY *E. C. McRae*
*J. R. Faulkner*
*L. H. Oster*

ATTORNEYS

United States Patent Office 2,726,894
Patented Dec. 13, 1955

2,726,894

MOTOR VEHICLE BODY CONSTRUCTION

Charles William Bugbee, Birmingham, Mich., assignor to Ford Motor Company, Dearborn, Mich., a corporation of Delaware Application December 9, 1954, Serial No. 474,055

3 Claims. (Cl. 296—44.5)

This invention relates generally to a motor vehicle body construction, and has particular reference to a window frame and glass run assembly for guiding and supporting the window glass of a motor vehicle.

It is conventional practice in motor vehicle body construction to mount a glass run assembly within the window frame. The glass run assembly is usually held in place within the frame by means of clips spaced along the glass run. The present invention contemplates a design of window frame and cooperating glass run assembly such that the need for separate fastening clips is eliminated and the glass run assembly can be readily snapped into place in the window frame and held in assembled relationship therewith yet may be readily removed therefrom without the need for special tools. A saving in material cost and also in assembly time is thus made possible.

Other objects and advantages of this invention will be made more apparent as this description proceeds, particularly when considered in connection with the accompanying drawings, wherein.

Figure 1:
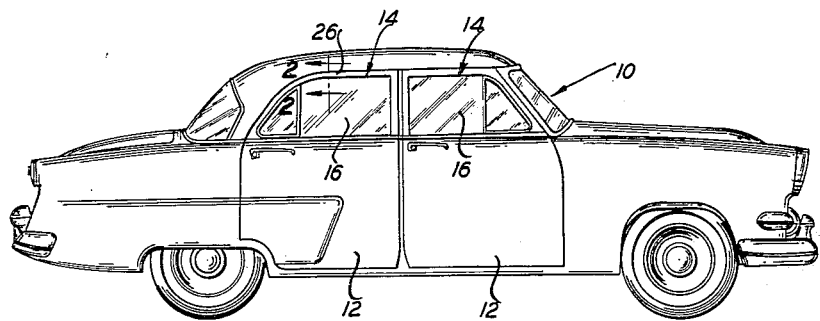
Figure 1 is a side elevational view of a motor vehicle incorporating the present invention.

Referring now to the drawings, the reference character 10 indicates a motor vehicle body having doors 12 supporting window frames 14 forming guiding and supporting means for the window glass 16.

Figure 2:
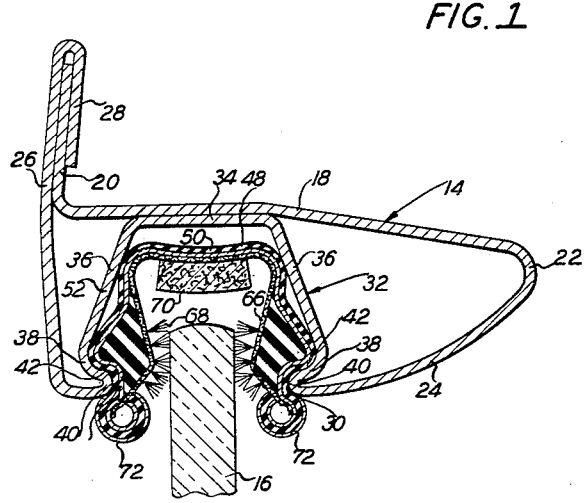
Figure 2 is a cross sectional view taken on the line 2—2 of Figure 1.

Referring particularly to Figure 2, the window frame 14 is a one-piece formed sheet metal frame forming an enclosed box section type construction. The frame has an outer wall 18 formed at its outboard edge with an upstanding marginal flange 20 and having a return bent inboard portion 22 continuing into an inner arcuate wall 24. An outboard side flange 26 is formed integrally with the inner wall 24 and has a return bent marginal flange 28 overlapping the marginal flange 20 of the outer wall and secured thereto, as by welding. A weatherstrip (not shown) may be secured to the marginal flange 28 to engage the vehicle body and form a seal therewith.

The inner wall 24 of the window frame 14 is formed with an elongated slot 30 therein which forms the open side of a generally U-shaped glass run channel 32. The glass run channel 32 is integrally formed with the window frame 14 and has a base 34 positioned adjacent the outer wall 18 of the window frame and suitably welded thereto. The glass run channel 32 also has flared or diverging side walls 36 which are connected by arcuate connecting portions 38 to rolled edges 40 adjacent the opposite sides of the slot 30 formed in the inner wall 24 of the window frame. It will be seen that the arcuate connecting portions 38 and the rolled edges 40 form shoulders 42 which face toward the base 34 of the glass run channel 32.

Figure 3:
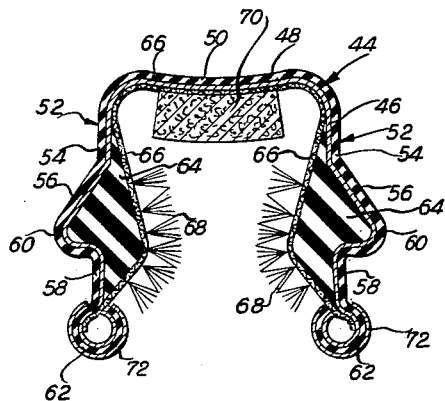
Figure 3 is an enlarged cross sectional view of the glass run assembly shown in Figure 2 separated from the window frame.

With reference now to Figures 2 and 3, the reference character 44 indicates a glass run assembly having a galvanized metal core 46, the exterior side of which is covered by a cotton adhesive rubberized tape cover 48.

The core 46 and the cover 48 are generally U-shaped in cross section and form a base 50 and opposite side flanges 52. The side flanges 52 have a flat portion 54 joined to and extending generally at right angles to the base 50, and an intermediate outwardly flared or diverging portion 56. The diverging intermediate portions 56 are connected to intermediate flat portions 58 by means of arcuate connecting portions 60, and the intermediate portions 58 are formed at their marginal edges with rolled portions 62.

In the assembled position of the glass run as shown in Figure 2, the flat portions 52 and 58 of the side flanges of the glass run assembly are in alignment, while in the free position of the glass run assembly as shown in Figure 3 the side flanges are formed with the portions 58 spaced apart a greater distance than the portions 52. This insures a snug fit during assembly.

A rubberized cotton filler 64 is secured to the side flanges 52 of the glass run assembly and supports a textile lining 66, the intermediate portion of which is secured to the base 50 of the glass run assembly. Oppositely directed pile 68 extends from the side portions of the textile lining 66 to guide and support the window glass 16. A felt strip 70 is suitably secured to the textile lining adjacent the base 50 of the glass run assembly to cushion and guide the edge of the window glass.

To assemble the glass run assembly 44 to the window frame 14 it is only necessary to apply pressure to the glass run assembly to force it into the window frame past the neck portion formed at the elongated opening 30 in the inner wall 24 of the frame. Since the side walls 52 of the metal core of the glass run assembly are flexible, they may be readily collapsed toward each other to permit the outwardly flared intermediate portions 56 and the arcuate connecting portions 60 of the glass run assembly to pass the rolled portions 40 of the window frame 14. Thereafter the side flanges 52 of the glass run assembly spring outwardly to engage the arcuate portions 60 of the glass run assembly with the shoulders 42 formed in the glass run channel 32 of the window frame 14.

In the assembled position as shown in Figure 2 it will be seen that the size and shape of the arcuate connecting portions 60 of the glass run assembly corresponding to the size and shape of the arcuate connecting portions 38 of the glass run channel 32 to form a snug interlock therebetween. In this assembled position the base 50 of the glass run assembly is parallel to but spaced from the base 34 of the glass run channel 32, and the corners of the channel shaped glass run assembly are in contact with the diverging side walls 36 of the glass run channel 32 to form a stable mounting for the glass run assembly within the window frame.

When assembled, the side flanges 52 of the glass run assembly are under a slight load to hold the flat intermediate portions 58 thereof in snug engagement with the rolled portions 40 of the window frame. A rustless steel bead 72 forms a decorative trim for the rolled marginal edges 62 of the side flanges 52 of the glass run assembly and project outwardly of the window frame adjacent the sides of the elongated slot 30 therein.

It will be seen that the glass run assembly is thus wedged into an interlocked position within the window frame and cannot become inadvertently disengaged. To remove the glass run assembly from the window frame, however, it is only necessary to bend the side flanges 52 of the glass run assembly toward each other to permit the glass run to be withdrawn past the rolled edges 40 at the sides of the slot 30.

Figure 4:
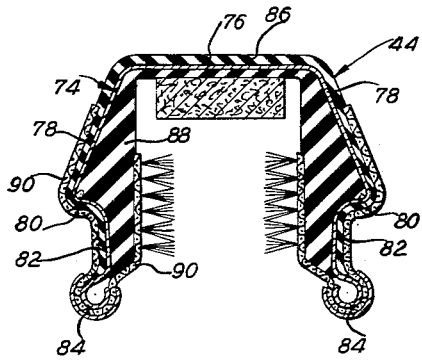
Figure 4 is an enlarged cross sectional view similar to Figure 3 but showing a modified glass run assembly.

Figure 4 illustrates a modification of glass run assembly in which the metal core 74 is formed with a base 76, outwardly flared side walls 78, shoulders 80, flat interconnecting portions 82, and outer rolled edges 84. A rubber compound 86 surrounds the metal core 76 and a rubberized filler 88 is secured to the inner surface thereof. A textile fabric 90 is secured both to the rubberized filler 88 and also extends around the outside of the core and is secured to the rubber coating 86. It will be seen that this glass run assembly can be inserted into the window frame 14 shown in Figure 2 and that the shoulders 80 will interlock with the shoulders 42 of the glass run channel 32 to removably retain the glass run assembly within the window frame.

It will be understood that the invention is not to be limited to the exact construction shown and described, but that various changes and modifications may be made without departing from the spirit and scope of the invention, as defined in the appended claims.

What is claimed is:

1. In a motor vehicle, a sheet metal window frame having a glass run channel generally U-shaped in cross section, said channel having a base and a pair of outwardly flared legs extending integrally from opposite sides of said base, each of said legs having an integral inwardly projecting retaining portion adjacent its marginal edge, a glass run assembly generally U-shaped in cross section and having a base and a pair of generally parallel side flanges, said side flanges having integral outwardly projecting retainable ribs intermediate their width arranged to engage the inwardly projecting retaining portions on the legs of said glass run channel, the side flanges of said glass run being flexible and adapted to be moved toward each other to permit said outwardly projecting retainable ribs to be inserted into said glass run channel beyond the inwardly projecting retaining portions of the legs thereof and into interlocking engagement therewith, a textile lining for said glass run assembly carrying inwardly projecting pile at opposite sides thereof, and a felt strip secured to the base of said glass run assembly and cooperating with the inwardly extending pile to guide and cushion the window glass in said window frame.

2. The structure defined by claim 1 which is further characterized in that arcuate connecting portions are provided between the outwardly flared legs of the glass run channel and the inwardly projecting marginal retaining portions thereof, and the outwardly projecting retainable ribs on the side flanges of the glass run assembly are arcuate in shape and corresponding in size and shape to said arcuate interconnecting portions to form an interlocking fit therewith.

3. In a motor vehicle having a vertically slideable window glass, a sheet metal window frame for supporting and guiding said slideable window glass, said window frame being of generally box cross section and having an imperforated outer wall and an inner wall formed with an elongated slot therein intermediate the inboard and outboard edges of the window frame, said window frame having a U-shaped glass run channel formed integrally with the inner wall of the frame with the opposite legs of the channel joining the inner wall adjacent the marginal side edge of the elongated channel formed therein and with the base of the channel in juxtaposition to the inner side of the outer wall of the window frame, the side legs of said glass run channel extending from opposite sides of the base of the channel in diverging relationship and joining the inner wall of the window frame in return bent rolled portions forming retaining shoulders facing toward the base of the channel, and a glass run assembly adapted to be releasably held in said glass run channel, said glass run assembly having a generally U-shaped metal core extending generally parallel to the base of the glass run channel and side flanges formed integrally with the base and extending along the inner sides of the side legs of the channel, an integral outwardly projecting retainable rib formed centrally of each side flange of the metal core of the glass run assembly, the outer portions of said ribs being spaced apart a distance greater than the width of the elongated opening in the inner wall of the window frame, the side flanges of the metal core of the glass run assembly being flexible and adapted to be bent toward each other to enable the ribs to be inserted into the glass run channel and interlocked with the shoulders formed at the junctions between the diverging legs of the glass run channel and the inner wall of the window frame, the side flanges of the metal core of the glass run assembly having rolled portions at their marginal edges projecting beyond the inner wall of the window frame adjacent the opposite side edges of the elongated opening therein, a resilient liner secured to the inner portion on the metal core of the glass run assembly, a textile lining secured to said resilient liner and having opposed pile portions adapted to engage the opposite sides of the window glass, and a resilient strip secured to the base of the metal core of the glass run assembly to cushion the edges of the window glass.

References Cited in the file of this patent

UNITED STATES PATENTS

| | | |
|---|---|---|
| 2,058,793 | Hoffman | Oct. 27, 1936 |
| 2,443,676 | Cosper | June 22, 1948 |
| 2,474,985 | Rivard et al. | July 5, 1949 |
| 2,555,952 | Bailey | June 5, 1951 |